United States Patent [19]

Shephard et al.

[11] Patent Number: 5,000,499
[45] Date of Patent: Mar. 19, 1991

[54] DEFLECTABLE VEHICLE BUMPER

[75] Inventors: Roy A. Shephard, Minto; Alex D. Constas, Fredericton, both of Canada

[73] Assignee: Marenco Ltd., Fredericton, Canada

[21] Appl. No.: 430,618

[22] Filed: Oct. 31, 1989

Related U.S. Application Data

[63] Continuation-in-part of Ser. No. 239,280, Sep. 1, 1988, abandoned.

[51] Int. Cl.⁵ ............................................. B60R 19/04
[52] U.S. Cl. .................................... 293/150; 293/152; 293/153; 188/376
[58] Field of Search .............. 293/149, 150, 151, 152, 293/153; 188/376

[56] References Cited

U.S. PATENT DOCUMENTS

| | | | |
|---|---|---|---|
| 3,596,963 | 8/1971 | Phillips | 293/150 X |
| 3,907,352 | 9/1975 | Spain et al. | 293/152 |
| 3,924,888 | 12/1975 | Butcher et al. | 293/149 X |
| 4,130,312 | 12/1978 | Cooper, Sr. | 293/153 |

Primary Examiner—Margaret A. Focarino
Assistant Examiner—Andrew C. Pike
Attorney, Agent, or Firm—Fleit, Jacobson, Cohn, Price, Holman & Stern

[57] ABSTRACT

A deflectable vehicle bumper has a central frame member attachable to a front of a vehicle, and a pair of laterally extending wing members for protruding beyond the side of the vehicle, each wing member being substantially coplanar with the central frame member and attached thereto. Each wing member comprises a rigid plate having an inner end portion overlapping and detachably secured to the central frame member, and each plate has a vertical line of weakness constituting a fracture line outside the inner end portion, the fracture line ensuring that the plate fractures when a predetermined rearward force is applied thereto. A strip of resilient material is sandwiched between the overlapping plate and central frame member, the strip of resilient material being attached to the plate on each side of the fracture line. The wing members are retained substantially in a laterally extended position during minor impacts, and the resilient sheet restores the wing members to the laterally extended position after fracture of the plate has occurred.

12 Claims, 5 Drawing Sheets

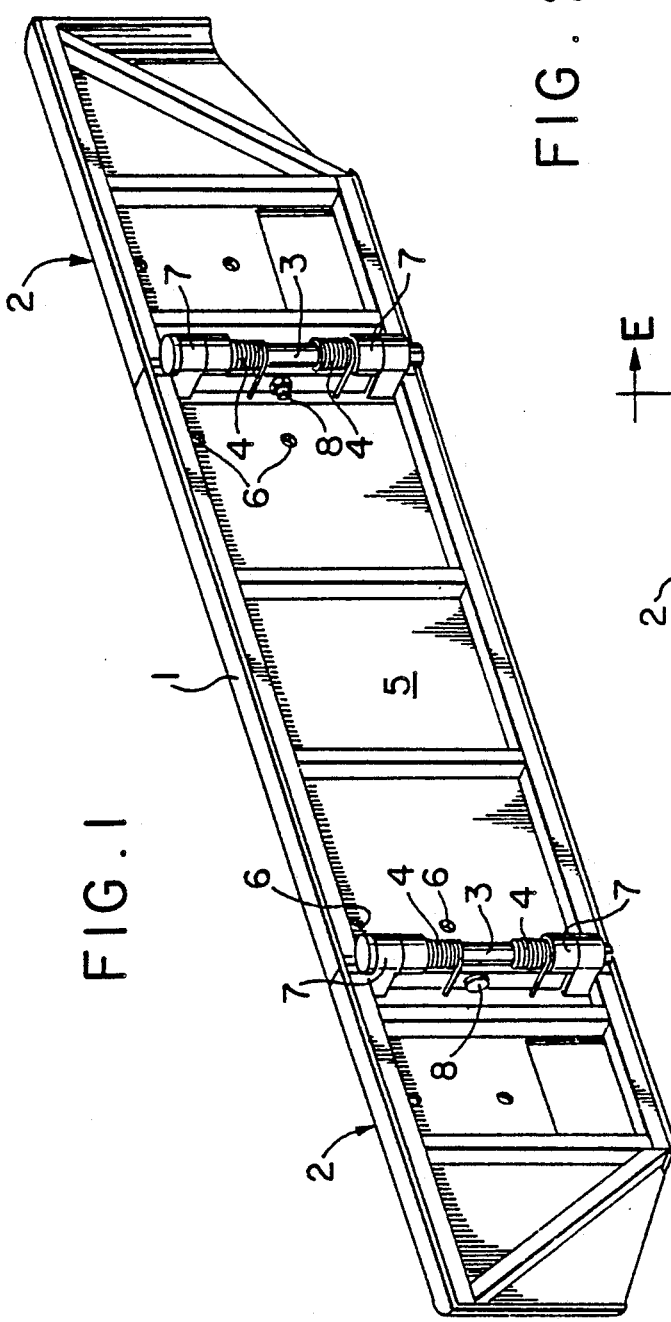
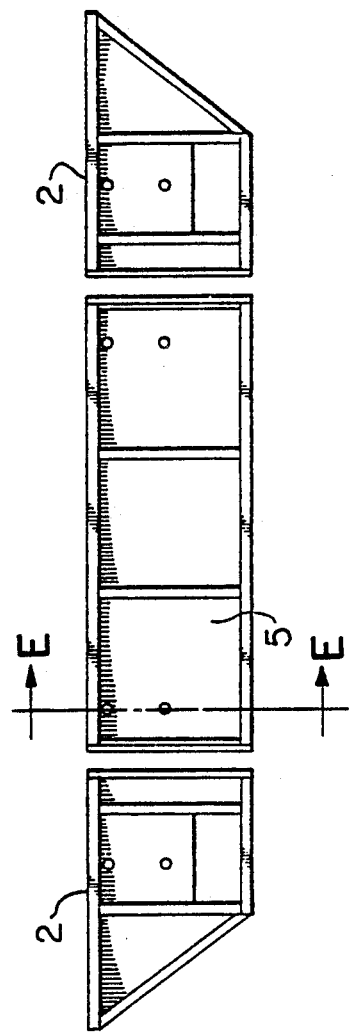

DEFLECTABLE VEHICLE BUMPER

This application is a continuation-in-part of our application Ser. No. 239280 filed on Sept. 1, 1988, now abandoned.

BACKGROUND OF THE INVENTION

The invention relates to a vehicle bumper of the type particularly adapted for use on large trucks, such as tractor-trailers, transport, logging, and other large heavy-duty vehicles.

At present, it is common practice to mount protective bumpers on the front of such vehicles in order to prevent damage to the main chassis, fenders, and sides of the vehicle if it runs into obstacles. These bumpers are in the form of one rigid piece mounted on the front of the vehicle with lateral portions protruding beyond the sides.

In the event of a major impact the protruding side portions are often bent backwards into engagement with the vehicle tires. This results in damage or puncture to the tires and disablement of the steering mechanism.

Truck owners and operators often cut off the protruding side portions or add hardwood or steel backing panels behind the bumper in an effort to avoid this problem.

U.S. Pat. No. 3,843,180 (Alexander) discloses a bumper with the end-section cut off and pivoted to the main section by means of special couplings including shear pins. However, the couplings are complicated to make, and it is also difficult to control the breaking force required to pivot the wing sections. In the event that the shear pins break, they are not easily replaceable and the truck must generally be returned to a service depot to restore the bumper. It is an object of the invention to provide a truck bumper that overcomes the problems set forth above and which is easy to restore and has a reliable breaking point.

SUMMARY OF THE INVENTION

According to the present invention there is provided in a deflectable vehicle bumper comprising a central frame member attachable to a front of a vehicle, a pair of laterally extending wing members for protruding beyond the sides of the vehicle, each wing member being substantially coplanar with the central frame member and being attached thereto, the improvement wherein each wing member comprises a rigid plate having an inner end portion overlapping and detachably secured to the central frame member, and each plate has a vertical line of weakness constituting a fracture line outboard of points of attachment of the rigid plate to central frame member, the fracture line ensuring that the plate fractures when a predetermined rearward force is applied thereto, and a strip of resilient material attached to the plate on either side of the fracture line, whereby the wing members are retained substantially in a laterally extended position during minor impacts, and the resilient strip restores the wing members to the laterally extended position after fracture of the plate.

Preferably the strip of resilient material is sandwiched between the rigid plate and the central frame member.

In a preferred embodiment the resilient sheath is made of thick rubber. The zone of weakness is preferably in the form of a V-shaped groove cut to a pre-determined depth on the inside surface of the plate.

The bumper described above works in the same way as a conventional bumper during normal operation. During minor impacts the wing members do not deflect and they thus serve to protect the sides of the vehicle in the same manner as the lateral portions of a conventional bumper. However, in the event of a major impact, the plate fractures and the wing members deflect rearward to the point where, if the impact is large enough, they strike the vehicle tires. Their rear face is preferably in the form of a smooth plate so that they bounce off the tires without causing damage. The resilient sheet returns them to their extended position. In this way, risk of damage to the tire is minimized, and the risk of a major impact permanently affecting the steerability of the vehicle is substantially reduced because the wing members are returned to their extended position.

BRIEF DESCRIPTION OF THE DRAWINGS

The invention will now be described in more detail, by way of example only, with reference to the accompanying drawings, wherein:

FIG. 1 is an isometric perspective view of a deflectable vehicle bumper;

FIG. 2 is a front plan view of the deflectable bumper with the hinges removed;

DESCRIPTION OF THE PREFERRED EMBODIMENT

Figure 3:
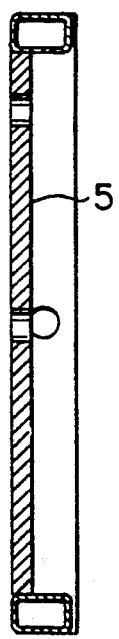
FIG. 3 is a cross-sectional view taken along the line E—E in FIG. 2.

The vehicle bumper shown in FIG. 1 comprises a central rectangular rigid steel frame 1 having steel plates 5 secured to its front side. The steel plates 5 have holes 6 for receiving bolts to mount the central frame 1 securely to the front of the vehicle.

A pair of lateral wing portions 2 are securely hinged to the central frame member 1 by means of hinge pins 3 extending through hinge socket 7. The hinge pins 3 permit the wings 2 to swing rearwards.

A pair of strong torsion springs 4 are disposed around the hinge pins 3. The torsion springs 4 are designed to prevent the wings from swinging until the applied force exceeds a certain limiting value, which can be anywhere from about 500 to 2,500 lbs. The preferred range is from 500 to 1,000 lbs.

Figure 6:
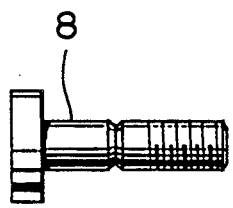
FIG. 6 shows a fracture pin.

Fracture pins 8, as shown in more detail in FIG. 6, extend through the adjacent frame members in the central frame 1 and the wing portions 2 to lock the wing portions in the laterally extended position until the breaking force of the fracture pins is exceeded. This is preset at an appropriate value in the above range of 500 to 2,500 lbs. depending on the requirement of the particular industry.

Smooth plates, not shown, are bolted onto the rear side of the wings 2 so as to ensure that in the event of an impact with the vehicle tires the risk of damage is minimized.

Figure 4:
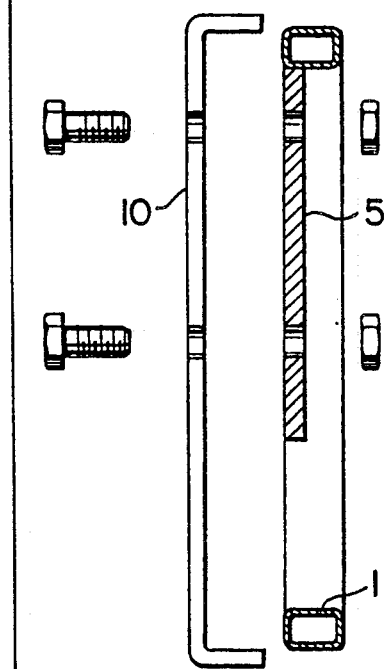
FIG. 4 is an exploded cross-sectional view of one of the wing members shown in FIG. 2.
Figure 5:
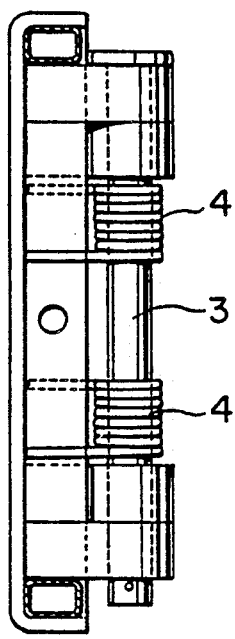
FIG. 5 is a detail showing the hinge construction.

FIGS. 2 to 4 show in more detail the construction of the bumper. FIG. 4 shows a front plate 10 bolted to the front of the wing members for aesthetic purposes.

The bumper as described thus far has advantages over a conventional rigid bumper in that it reduces tire damage on impact. However, it is relatively expensive to make and the wing members cannot be easily changed.

Figure 7:
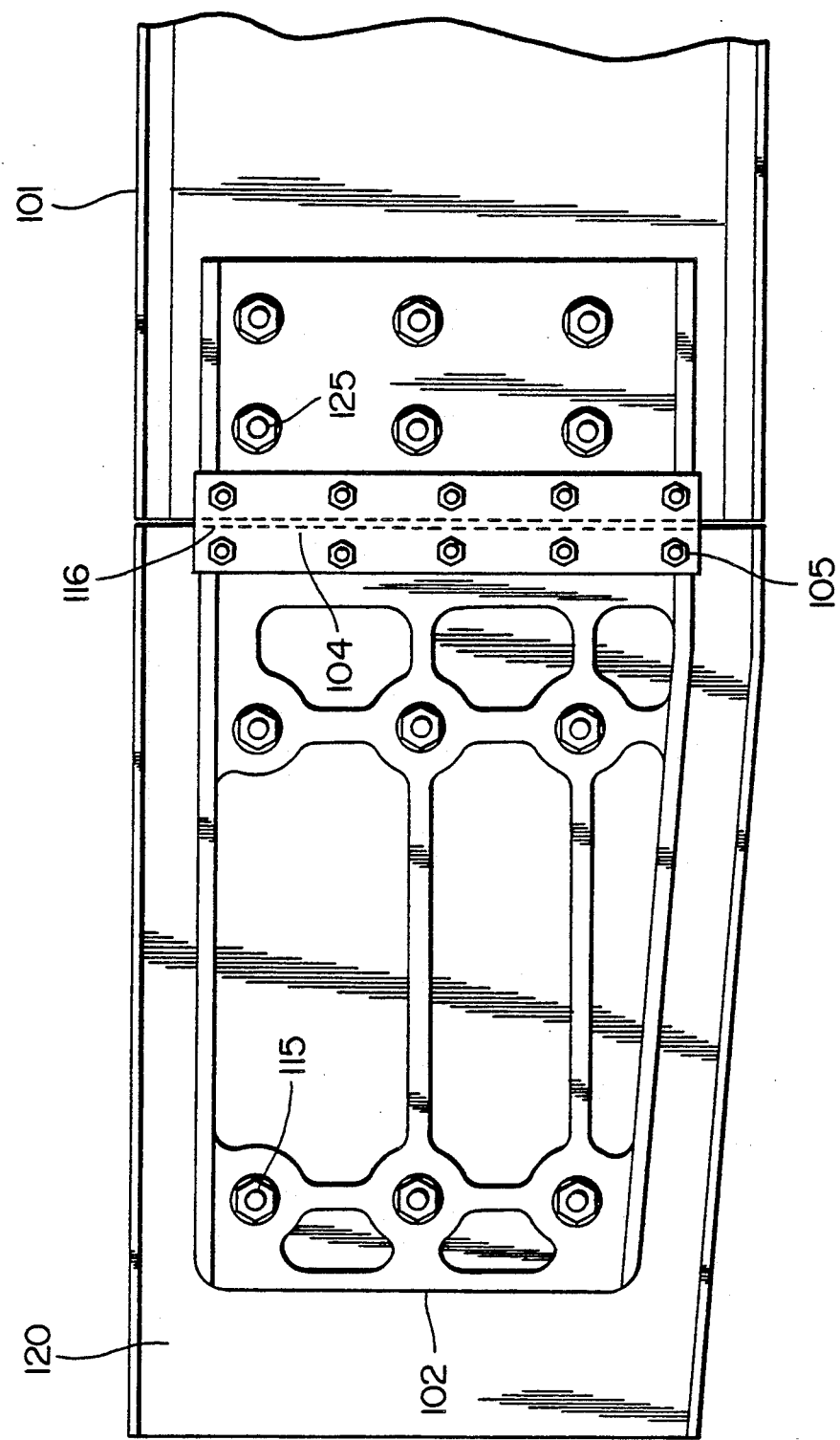
FIG. 7 shows a part of one embodiment of a bumper in accordance with, viewed from the rear, showing the wing section forming the fracture plate.

A bumper according to one embodiment of the invention is shown in FIG. 7. This has a wing member 102, consisting of an aluminum fracture plate, receiving a cover plate 120 bolted thereon by means of bolts 115.

Figure 10:
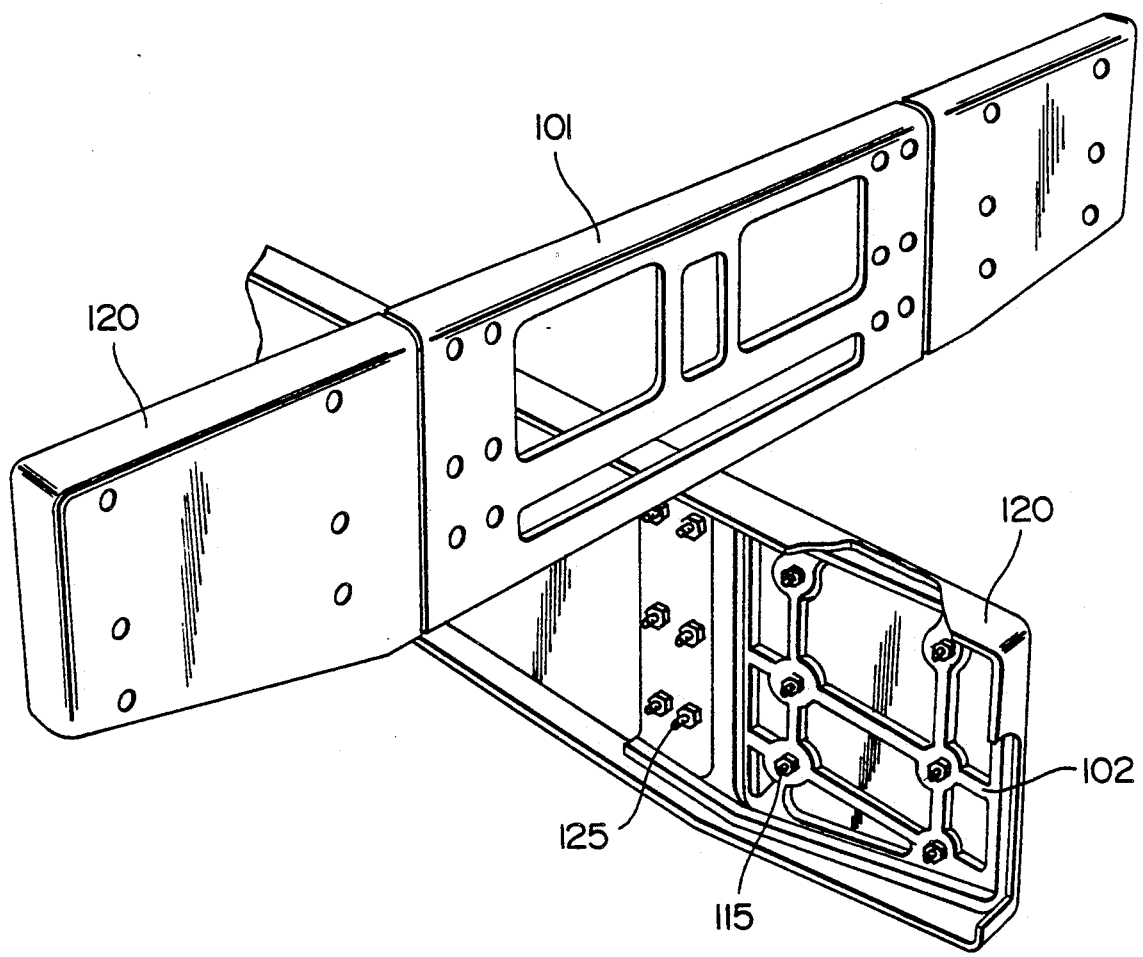
FIG. 10 shows perspective views of the deflectable vehicle bumper shown in FIG. 8.

Central frame member 101 is substantially co-planar with the wing member 102, but overlaps the inner end portion 103 of the wing member 102 and is bolted thereto by bolts 125 (see also FIG. 10). Outboard of the bolts 125 is a V-shaped vertical groove 116 constituting a line of weakness in the wing member 102.

A resilient strip 104 of thick rubber constituting a strong rubber hinge is secured to the rear of the wing member 102 on either side of the vertical groove 116 so that in the event the wing member 102 fractures, the outboard portion is quickly returned to its normal position under the influence of the resilient strip 104. The resilient strip 104 can be secured by bolts 105 or other suitable means.

Figure 8:
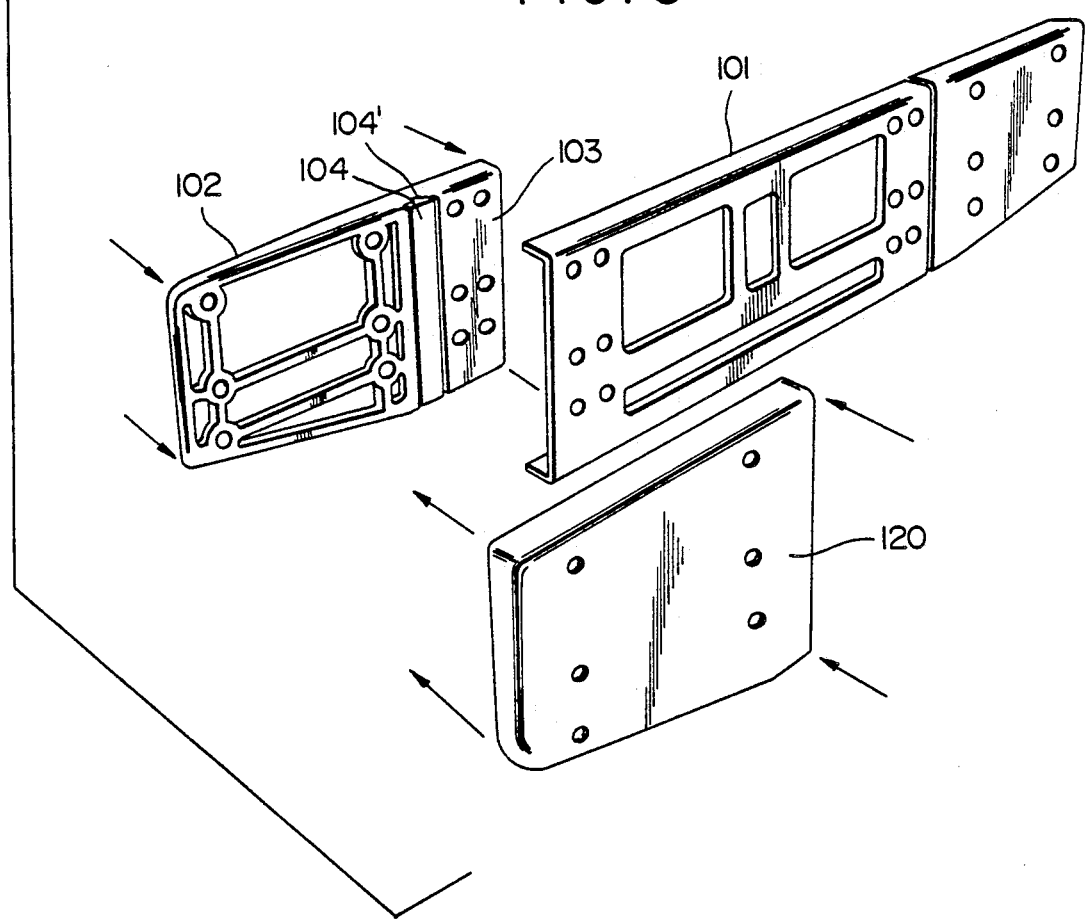
FIG. 8 is an exploded view of another embodiment of a deflectable vehicle bumper.

In FIG. 8, the resilient strip 104 is sandwiched between the overlapping portions of the wing member 102 and the central frame member 101. The resilient strip 104 has a V-shaped projection fitting into vertical groove 116.

The advantage of the arrangement described is that the load required to fracture the wing member 102 can be precisely determined by machining the groove 116. After it is fractured, a new plate can be quickly and conveniently mounted onto the bumper without the need to put the vehicle into a service bay. A new plate can be bolted on using easily available tools.

The bumper can be mounted to standard mounts that are currently in use to hold conventional bumpers. A decorative bumper can extend across the whole of the front of the main frame.

If desired, hydraulic or other shock absorber devices can be connected to the swingable wing members to help further reduce the risk of damage to the vehicle.

The described bumper considerably reduces the risk of damage to vehicles and significantly contributes to an increase in safety. The risk of puncturing the vehicle tires is significantly reduced and the chance of the steering properties of the vehicle being damaged in an accident is lessened.

Figure 9A:
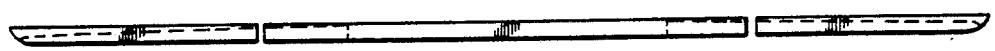
FIG. 9a is a plan view of a deflectable vehicle bumper according to the invention prior to collision.
Figure 9B:
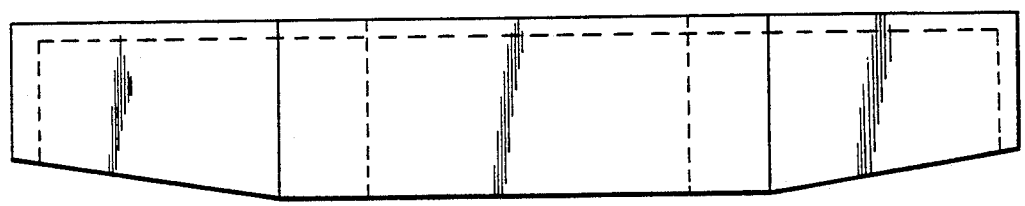
FIG. 9b is a front view of a deflectable vehicle bumper according to the invention prior to collision.
Figure 9C:
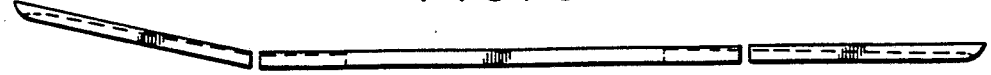
FIG. 9c is a plan view of a deflectable vehicle bumper according to the invention after collision.

FIGS. 9a to 9c show how the described bumper deforms after a collision, and from FIG. 9c it will be seen that the fracture wing member remains straight, clear of the vehicle tires.

We claim:

1. In a deflectable vehicle bumper for a vehicle having a front and sides including a central frame member attachable to the front of a vehicle, a pair of laterally extending wing members for protruding beyond the sides of the vehicle, each wing member being substantially coplanar with said central frame member and being attached thereto, the improvement wherein each wing member comprises:

a rigid plate having an inner end portion overlapping and detachably secured to said central frame member;

each rigid plate having a vertical line of weakness constituting a fracture line outboard of points of attachment of said rigid plate to said central frame member, said fracture line ensuring that said plate fractures when a predetermined rearward force is applied thereto; and a strip of resilient material attached to said plate on either side of said fracture line, so that said wing members are retained substantially in a laterally extended position during minor impacts, and said resilient strip of material restores the respective wing member to the laterally extended position after fracture of said rigid plate.

2. A deflectable vehicle bumper as claimed in claim 1, wherein said strip of resilient material is sandwiched between said rigid plate and said central frame member.

3. A deflectable vehicle bumper as claimed in claim 2, wherein said resilient strip is made of thick rubber.

4. A deflectable vehicle bumper as claimed in claim 1, wherein said rigid plates are bolted to said central frame member.

5. A deflectable vehicle bumper as claimed in claim 4, wherein said predetermined force is about 500 lbs.

6. A deflectable vehicle bumper as claimed in claim 5, wherein smooth cover plates are bolted onto the front of said wing members.

7. A deflectable vehicle bumper as claimed in claim 6, wherein said plates are made of aluminum.

8. A deflectable vehicle bumper as claimed in claim 7, wherein said resilient strip is made of thick rubber.

9. A deflectable vehicle bumper as claimed in claim 1, wherein said predetermined force is about 500 lbs.

10. A deflectable vehicle bumper as claimed in claim 1, wherein smooth cover plates are bolted onto the front of said wing members.

11. A deflectable vehicle bumper as claimed in claim 1, wherein said resilient strip is made of thick rubber.

12. A deflectable vehicle bumper as claimed in claim 1, wherein said plates are made of aluminum.

* * * * *